(12) United States Patent
Venezia et al.

(10) Patent No.: US 12,492,532 B2
(45) Date of Patent: Dec. 9, 2025

(54) PILE APPROACH ASSIST

(71) Applicants: CNH Industrial America LLC, New Holland, PA (US); CNH Industrial Italia S.p.A, Turin (IT)

(72) Inventors: Antonio Venezia, Turin (IT); Mark Ervin Krogen, West Fargo, ND (US); Scott Elkins, Homer Glen, IL (US); Brad Stemper, Racine, WI (US)

(73) Assignees: CNH INDUSTRIAL AMERICA LLC, New Holland, PA (US); CNH INDUSTRIAL ITALIA S.P.A, Turin (IT)

( * ) Notice: Subject to any disclaimer, the term of this patent is extended or adjusted under 35 U.S.C. 154(b) by 159 days.

(21) Appl. No.: 18/407,662

(22) Filed: Jan. 9, 2024

(65) Prior Publication Data
US 2025/0223780 A1   Jul. 10, 2025

(51) Int. Cl.
*E02F 9/20* (2006.01)
*E02F 3/28* (2006.01)
*E02F 3/43* (2006.01)

(52) U.S. Cl.
CPC ............ *E02F 9/2087* (2013.01); *E02F 3/283* (2013.01); *E02F 3/431* (2013.01)

(58) Field of Classification Search
CPC ......... E02F 3/431; E02F 9/2246; B60L 53/36; B60L 7/18; A01C 11/02; E21B 3/025; B62D 5/001; G06F 8/70
See application file for complete search history.

(56) References Cited

U.S. PATENT DOCUMENTS

| | | | | |
|---|---|---|---|---|
| 2009/0101101 A1* | 4/2009 | Iwamoto | ............... | E02F 9/2246 123/198 C |
| 2023/0144575 A1* | 5/2023 | Kvist | ..................... | B60L 53/36 320/109 |

FOREIGN PATENT DOCUMENTS

| AU | 2011262763 A1 * | 1/2013 | ............ B60L 7/18 |
|---|---|---|---|
| CN | 108170084 A * | 6/2018 | ............ G06F 8/70 |
| CN | 115038635 A * | 9/2022 | ............ B62D 5/001 |
| EP | 3530811 B1 * | 10/2022 | ............ E21B 3/025 |
| JP | 3860678 B2 * | 12/2006 | ............ A01C 11/02 |
| JP | 3922820 B2 * | 5/2007 | ............ A01C 11/02 |
| WO | WO-2011155612 A1 * | 12/2011 | ............ B60L 7/18 |

* cited by examiner

*Primary Examiner* — Yuri Kan
(74) *Attorney, Agent, or Firm* — Foley & Lardner LLP

(57) ABSTRACT

One method may include adjusting a first operating parameter of a digging implement of the vehicle; advancing the digging implement to a digging location; engaging the digging implement with a diggable medium located at the digging location; determining a vehicle operating parameter; upon the vehicle operating parameter exceeding a threshold, adjusting the first operating parameter of the digging implement of the vehicle; advancing the digging implement of the vehicle; upon the vehicle operating parameter exceeding a second predetermined threshold, adjusting the first operating parameter and a second operating parameter of the digging implement of the vehicle; upon the second operating parameter reaching a third predetermined threshold, withdrawing the digging; upon withdrawing the digging implement beyond the digging location, adjusting the first operating parameter of the digging implement of the vehicle; and unlocking the steering mechanism of the vehicle.

20 Claims, 9 Drawing Sheets

PILE APPROACH ASSIST

BACKGROUND

Inexperienced operators of heavy equipment often execute digging procedures in a suboptimal manner. This suboptimal procedure can result in unnecessary stress on the vehicle, decreased fuel efficiency, increasing time to complete work, and reducing load capacity. Thus, a method and system are needed to repeatably perform optimized digging/loading procedures independent of operator skill.

SUMMARY

The present disclosure is directed to a method, system, and apparatus that satisfies this need. In one embodiment, a vehicle with a boom and digging implement approaches a pile of diggable medium. The vehicle automatically adjusts the steering of the vehicle so as to advance directly into the pile. The vehicle then initiates a series of movements of the boom and digging implement while advancing into the pile of diggable medium. The vehicle then retreats from the pile of diggable medium upon optimally loading the bucket.

In one implementation, a method includes: upon receiving, by one or more processors, an indication to enable a Dig Mode of a vehicle, transmitting, by the one or more processors to one or more systems of the vehicle, instructions to perform a plurality of steps comprising: locking a steering mechanism of the vehicle; adjusting a first operating parameter of a digging implement of the vehicle; advancing the digging implement of the vehicle to a digging location; engaging the digging implement of the vehicle with a diggable medium located at the digging location; determining a vehicle operating parameter exerted of the vehicle; upon the vehicle operating parameter exceeding a first predetermined threshold, adjusting the first operating parameter of the digging implement of the vehicle; advancing the digging implement of the vehicle in the diggable medium; upon the vehicle operating parameter exceeding a second predetermined threshold, adjusting the first operating parameter and a second operating parameter of the digging implement of the vehicle; upon the second operating parameter reaching a third predetermined threshold, withdrawing the digging implement of the vehicle; upon withdrawing the digging implement of the vehicle beyond the digging location, adjusting the first operating parameter of the digging implement of the vehicle; and unlocking the steering mechanism of the vehicle.

In another embodiment, the first operating parameter of the digging implement of the vehicle is a vertical position of the digging implement.

In another embodiment, the second operating parameter of the digging implement of the vehicle is a curl position of the digging implement.

In another embodiment, the vehicle operating parameter is a torque exerted on the digging implement.

In another embodiment, the plurality of steps further comprising, upon receiving, by the one or more processors, a steering input from an operator interface, unlocking the steering mechanism of the vehicle and adjusting the steering mechanism to a position associated with the steering input from the operator interface.

In another embodiment, the one or more processors transmit an instruction to disable the Dig Mode in response to transmitting the instruction for unlocking the steering mechanism of the vehicle.

In another embodiment, the engaging the digging implement of the vehicle with a diggable medium comprises actuating one or more tractive elements of the vehicle to propel the vehicle and the digging implement in a trajectory towards the diggable medium.

According to another implementation, a system includes: a vehicle; a digging implement cooperatively coupled to the vehicle; and one or more processors configured to receive an indication to enable a Dig Mode and, upon receiving the indication to enable the Dig Mode, transmit instructions to one or more systems of the vehicle to perform a plurality of steps comprising: locking a steering mechanism of the vehicle; adjusting a first operating parameter of the digging implement of the vehicle; advancing the digging implement of the vehicle to a digging location; engaging the digging implement of the vehicle with a diggable medium located at the digging location; determining a vehicle operating parameter exerted of the vehicle; upon the vehicle operating parameter exceeding a first predetermined threshold, adjusting the first operating parameter of the digging implement of the vehicle; advancing the digging implement of the vehicle in the diggable medium; upon the vehicle operating parameter exceeding a second predetermined threshold, adjusting the first operating parameter and a second operating parameter of the digging implement of the vehicle; upon the second operating parameter reaching a third predetermined threshold, withdrawing the digging implement of the vehicle; upon withdrawing the digging implement of the vehicle beyond the digging location, adjusting the first operating parameter of the digging implement of the vehicle; and unlocking the steering mechanism of the vehicle.

In another embodiment, the first operating parameter of the digging implement of the vehicle is a vertical position of the digging implement.

In another embodiment, the second operating parameter of the digging implement of the vehicle is a curl position of the digging implement.

In another embodiment, the vehicle operating parameter is a torque exerted on the digging implement.

In another embodiment, the plurality of steps further comprising, upon receiving, by the one or more processors, a steering input from an operator interface, unlocking the steering mechanism of the vehicle and adjusting the steering mechanism to a position associated with the steering input from the operator interface.

In another embodiment, the one or more processors transmit an instruction to disable the Dig Mode in response to transmitting the instruction for unlocking the steering mechanism of the vehicle.

In another embodiment, the digging implement of the vehicle with a diggable medium comprises actuating one or more tractive elements of the vehicle to propel the vehicle and the digging implement in a trajectory towards the diggable medium.

According to another implementation, a vehicle including a digging implement cooperatively coupled to the vehicle; and one or more processors configured to receive an indication to enable a Dig Mode and, upon receiving the indication to enable the Dig Mode, transmit instructions to one or more systems of the vehicle to perform a plurality of steps comprising: locking a steering mechanism of the vehicle; adjusting a first operating parameter of the digging implement of the vehicle; advancing the digging implement of the vehicle to a digging location; engaging the digging implement of the vehicle with a diggable medium located at the digging location; determining a vehicle operating parameter exerted of the vehicle; upon the vehicle operating parameter exceeding a first predetermined threshold, adjusting the first operating parameter of the digging implement of the vehicle; advancing the digging implement of the vehicle in the diggable medium; upon the vehicle operating parameter exceeding a second predetermined threshold, adjusting the first operating parameter and a second operating parameter of the digging implement of the vehicle; upon the second operating parameter reaching a third predetermined threshold, withdrawing the digging implement of the vehicle; upon withdrawing the digging implement of the vehicle beyond the digging location, adjusting the first operating parameter of the digging implement of the vehicle; and unlocking the steering mechanism of the vehicle.

In another embodiment, the first operating parameter of the digging implement of the vehicle is a vertical position of the digging implement.

In another embodiment, the second operating parameter of the digging implement of the vehicle is a curl position of the digging implement.

In another embodiment, the vehicle operating parameter is a torque exerted on the digging implement.

In another embodiment, the plurality of steps further comprising, upon receiving, by the one or more processors, a steering input from an operator interface, unlocking the steering mechanism of the vehicle and adjusting the steering mechanism to a position associated with the steering input from the operator interface.

In another embodiment, the one or more processors transmit an instruction to disable the Dig Mode in response to transmitting the instruction for unlocking the steering mechanism of the vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
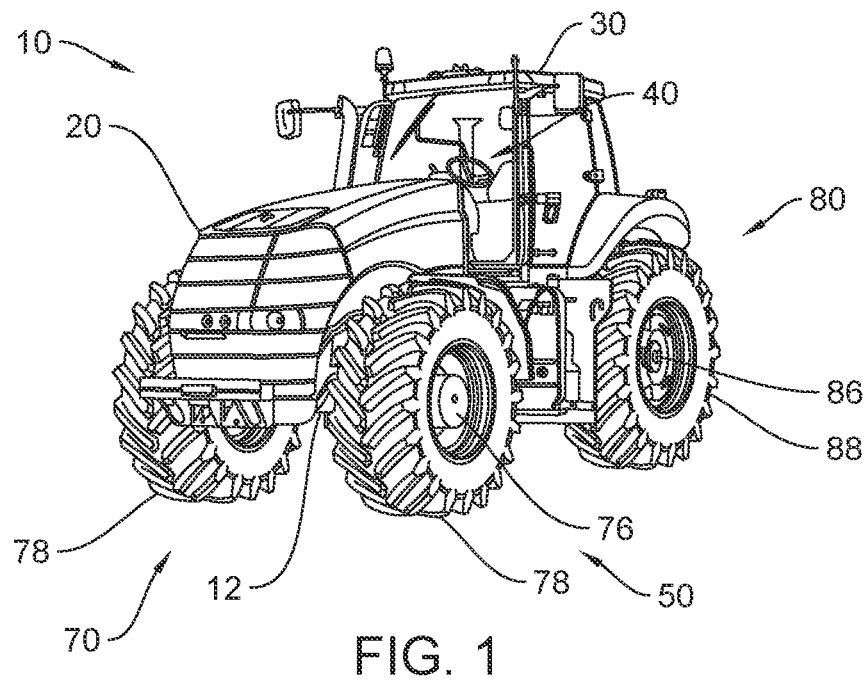
FIG. 1 is a perspective view of a vehicle, according to an exemplary embodiment.
Figure 2:
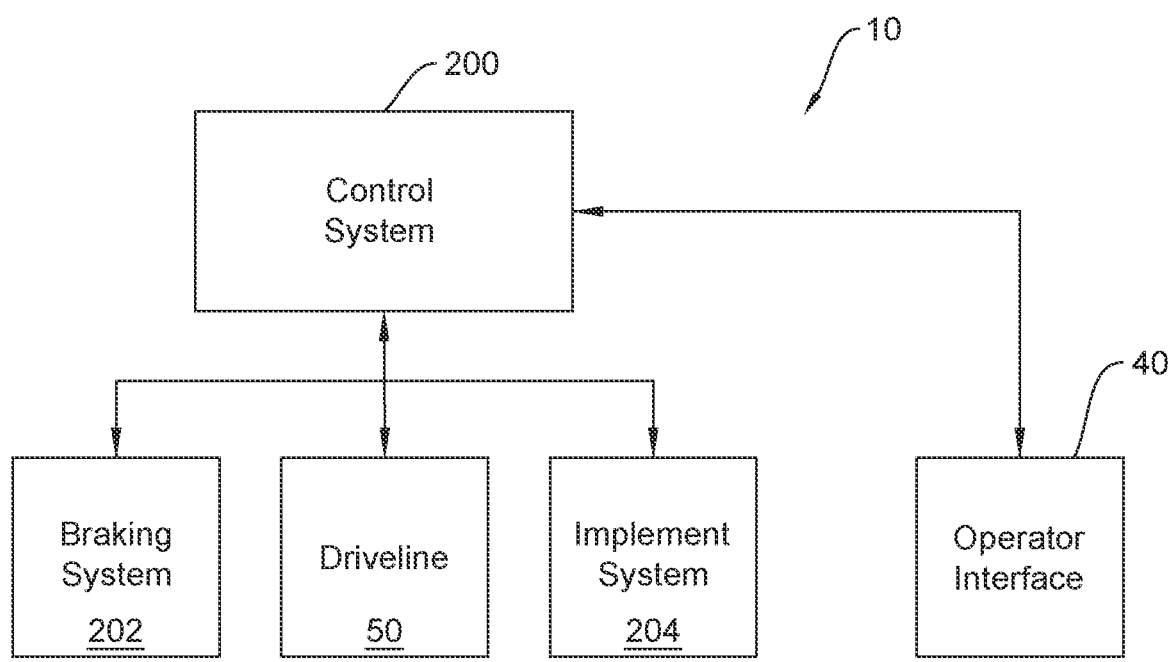
FIG. 2 is a schematic block diagram of the vehicle of FIG. 1, according to an exemplary embodiment.
Figure 3:
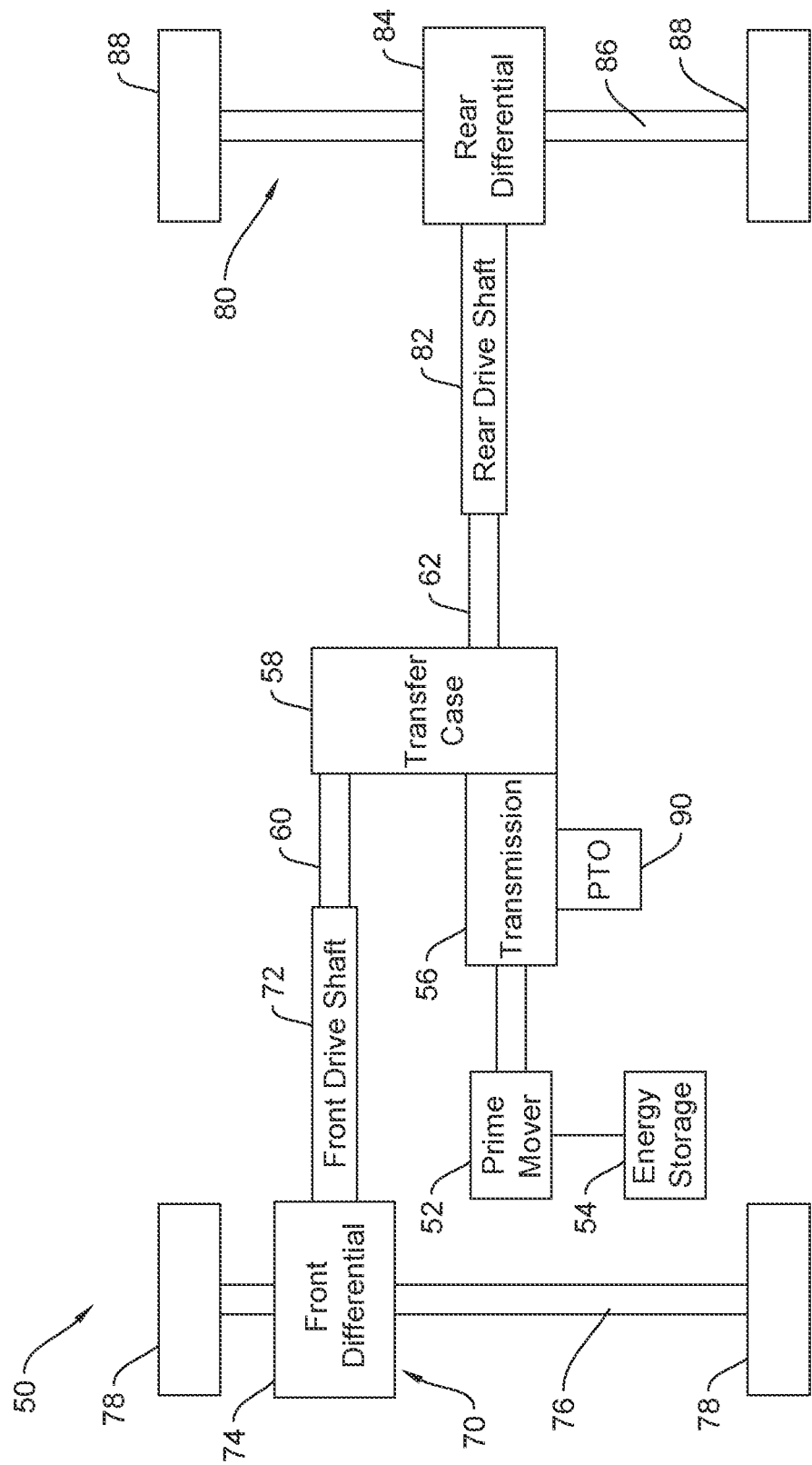
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 202, coupled to one or more components of the driveline 50 to facilitate selectively braking the one or more components of the driveline 50; and a vehicle control system, shown as control system 200, coupled to the operator interface 40, the driveline 50, the braking system 202, and the implement system 204. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 56) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 202 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 202 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Dig Mode

Figure 4:
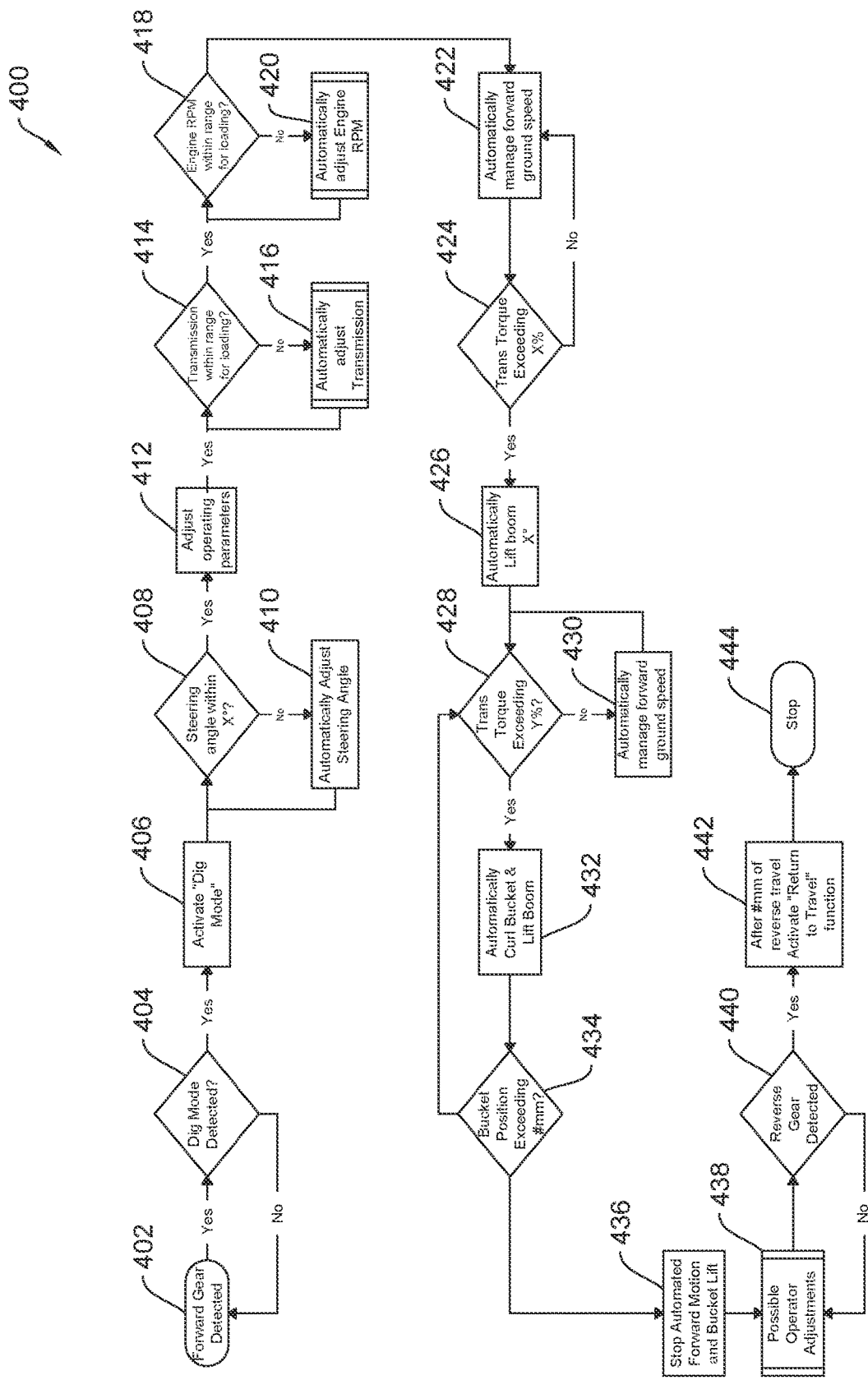
FIG. 4 is a schematic block diagram of a control system of the vehicle of FIG. 1, according to an exemplary embodiment.

Turning now to FIG. 4, a block diagram 400 for a Dig Mode of a work vehicle is shown. In some embodiments, the system and methods illustrated in FIG. 4 are executed by a vehicle such as vehicle 10 of FIG. 1 (e.g., a truck, an excavator, a tractor, a front-end loader, a backhoe, a skid steer, bulldozer, grader, crawler loaders, etc.). The vehicle 10 may have a digging implement attached thereto (e.g., front-end loader, a bucket, a hoe, a blade, etc.). The digging implement may be configured to be articulated in one or more dimensions (e.g., raised, lowered, curled, dumped, pivoted, etc.). The vehicle 10 may include one or more selectable driving modes (e.g., Travel Mode, Dig Mode, Hybrid Mode, Recording Mode), which will be described in detail in this disclosure.

In an exemplary embodiment, the vehicle 10 of FIG. 1 that is used to execute the method described in FIG. 4 is a front-loader digging with the front bucket. The method of FIG. 4 may be executed by one or more processors of the vehicle 10, housed locally and/or remotely. In an embodiment in which one or more processors executing a method 400 are housed remote to the vehicle 10, the remote one or more processors may be coupled to the vehicle 10 by a network and/or server.

At step 402, the one or more processors detect that the vehicle 10 is in a forward gear. Because in the exemplary embodiment the vehicle 10 is a front-end loader, the vehicle 10 is able to dig while traveling forward. However, it should be noted that in some embodiments, the vehicle 10 is able to dig in reverse or while travelling sideways. In these embodiments, the one or more processors detect a gear engagement that allows for digging in the geared direction. Once the forward (or otherwise digging direction) gear is detected, the one or more processors check to see if a Dig Mode of the vehicle 10 has been selected (e.g., by an operator making a selection on an operator interface, by one or more sensors detecting a loading event to occur, a remote operator making a selection, a voice command from within the cab etc.) at step 404. In some embodiments, the operator uses a voice command (e.g., "engage Dig Mode") to select the Dig Mode. In other embodiments, the operator interface includes an input device (e.g., a button, slider, dial, etc.) that the operator is able to use to select an operational mode (e.g., the Dig Mode, Travel Mode, Hybrid Mode, etc.). If the Dig Mode is not selected, the one or more processors return to step 402 to detect if the forward gear is engaged. If at step 404 the one or more processors detect a Dig Mode selection, then step 406 is executed. At step 406 the one or more processors activate the Dig Mode of the vehicle 10. In some embodiments, the Dig Mode is used to facilitate the loading (e.g., digging, scooping, etc.) of the vehicle 10 by removing certain steps in the digging/loading process from the operator's control. In addition, the Dig Mode optimizes the movement of the vehicle 10 during a loading event. For example, in some situations, loading of the vehicle 10 may be optimized by executing the steps 408-444.

At step 408, the one or more processors determine a steering angle of the vehicle 10 (e.g., by measuring a steering wheel position, a steering mechanism angle, a wheel angle, etc.) to verify that the steering angle is within a predefined steering threshold (e.g., the wheel in a substantially forward-facing position, such as a 0-degree steering angle). If the steering angle is determined to not be within the predefined steering threshold, the method continues to step 410. In step 410, the one or more processors automatically adjust the steering angle to be within the predefined steering angle threshold of step 408. This may be accomplished by automatically adjusting the steering wheel of the vehicle 10 or any other portion of the steering mechanism of the vehicle 10. In some embodiments, the predefined steering threshold is an angle other than 0 degrees (e.g., +/−5 degrees from 0 degrees). In some embodiments the operator may determine or set the pre-defined steering threshold through interacting with the operator interface. In other embodiments, the predefined steering threshold is determined based on the position of the vehicle 10 and a pile of diggable medium with which the vehicle 10 is set to engage. in some embodiments the position of the vehicle 10 with respect to the diggable medium is determined by one or more sensors of the vehicle 10, such as cameras, LiDAR, radar, and/or sonar.

The sensors may receive positional data of the vehicle and/or the pile of diggable medium. In addition, the sensors may receive qualitative/quantitative data (e.g., size of the pile of diggable medium, size of the individual components of the diggable medium, moisture content of the diggable medium, shape of the diggable medium) of the pile of diggable medium. The one or more processors may ingest this received data to determine an optimal attack steering angle, which generally will be directly into the pile. The one or more processors may then determine an acceptable threshold (e.g., the predetermined steering threshold) outside of this optimal angle of attack and automatically adjust the steering angle to be within the acceptable threshold.

If the steering angle of the vehicle 10 is determined to be within the steering angle threshold, the method continues to step 412. And step 412 the one or more processors activate a differential locking mechanism of the vehicle 10. In this step 412, the one or more processors may also transmit instructions to various other subsystems to adjust operating parameters to optimize loading/digging procedures. These operating parameters may include suspension height, suspension stiffness, weight distribution, PTO engagement, rear implement adjustment, light function, sound emission, water spray, heating/cooling of vehicle components, etc. Upon activating the differential locking mechanism (or adjust additional operating parameters) at step 412 the one or more processors continue to step 414.

At step 414, the one or more processors determine if the transmission is within a predefined range for loading (e.g., transmission speed, gear selection, etc.). If the transmission is not determined to be within a predefined range for loading at step 414, the one or more processors automatically adjust the transmission to be within the range for loading at step 416. This may involve adjusting (e.g., increasing or decreasing) the transmission speed or adjusting a gear selection (e.g., lowering or increasing a gear). After automatically adjusting the transmission at step 416 the one or more processors verify again if the transmission is within range for loading. Once the transmission is determined to be within range for loading, the one or more processors continue in executing step 418, where are they determine whether or not the engine revolutions per minute ("RPM") are within a range for loading. Again, if the engine RPMs are not within the range for loading, the one or more processors automatically adjust the engine RPMS to be within the range for loading at step 420. This RPM control may be accomplished through one or more processes including adjusting throttle control, fuel injection mixture ratios, ignition timing, air intake volume and speed, throttle position, governor adjustment, etc.

Once the engine RPMs are within the range for loading, the one or more processors automatically advance the vehicle 10 forward at step 422. In some embodiments, the one or more processors adjust the one or more digging parameters (e.g., bucket curl, bucket pivot, boom height, etc.) of the vehicle 10 prior to automatically advancing the vehicle 10 forward at step 422. For example, the one or more processors may transmit instructions to lower the front boom of the vehicle 10 and adjust the curl of the bucket to be resting upon the surface by which the diggable medium is supported. This allows the loader to engage with the pile of diggable medium at the lowest section of the pile. Once the one or more processors automatically advance the vehicle 10 forward with the bucket resting upon the surface, the one or more processors check the transmission torque at regular intervals at step 424. In continuously, or at intervals, checking the transmission torque, the one or more processors determine whether the transmission torque is exceeding a predefined threshold. If the transmission torque is not exceeding the predefined threshold the one or more processors continue to advance the vehicle 10 forward. Upon the transmission torque exceeding the predefined threshold due to the weight and resistance of the diggable medium of the pile (or some other external force), the one or more processors automatically lift the boom a predefined distance at step 426. This removes the support of the ground from the bucket and causes the front end of the vehicle to load with the weight of the diggable medium in the bucket. As the front end loads with the weight of the diggable medium in the bucket, the traction of the front tires will increase and the transmission torque will decrease to some extent.

After the transmission torque decreases after the lifting of the boom in step 426, the one or more processors then continue on to step 428 in which they determine whether or not the transmission torque is exceeding a second predefined threshold. If the transmission torque is not exceeding the second predefined threshold the one or more processors continue to automatically advance the vehicle 10 forward into the pile of diggable medium at step 430. As the bucket continues forward in the pile of diggable medium, the transmission torque will increase as the weight of the diggable medium in the bucket increases. Once the transmission torque exceeds the second predefined threshold, the one or more processors will automatically initiate a second digging movement at step 432. This second digging movement comprises of one or more adjustments to the boom, the bucket, the steering, and/or the transmission. In an exemplary embodiment, as illustrated in method 400, the one or more processors automatically lift the boom as the bucket curls up. Once the bucket reaches a predefined curl point (e.g., step 434), the boom will stop being lifted and the bucket will stop curling. In an alternative embodiment, the height of the boom triggers the next step of the method 400. At step 436, once the bucket has reached the predefined curl point, the one or more processors stop the forward movement of the vehicle 10. At step 438, the operator may make additional adjustments to the one or more systems of vehicle 10. For example, the operator may lift or lower the boom, curl the bucket, adjust the steering, etc. The one or more processors then put the vehicle 10 into reverse gear at step 440 and initiate a reverse movement of the vehicle 10 to remove the bucket from the pile of diggable medium. Once the vehicle 10 has traveled a distance backwards from the pile of diggable medium at step 442, the one or more processors may stop the reverse movement and enable a Travel Mode of the vehicle 10 at step 442. In some embodiments, the operator must initiate the reverse movement out of the diggable medium. In some embodiments, the steering, speed, and digging parameters are still in Dig Mode during this removal motion. Once the vehicle has traveled a calculated/measured distance back from the pile of diggable medium, the system may automatically adjust to travel mode. For example, the vehicle may automatically remove limits on speed, steering, and lower the boom. This may occur without the operator's input. In other embodiments, the system waits for the user's selection of Travel Mode to engage the vehicle's 10. Travel Mode. After step 442, the system stops at step 444.

In some embodiments, during the Dig Mode procedure the operator may exit the Dig Mode procedure at any time by one or more inputs. For example, if the operator applies one or more brakes to the vehicle 10 during the Dig Mode, the system may be configured to exit Dig Mode (and any automatic movements or adjustments) and stop completely. In other embodiments, the user may use voice commands (e.g., "stop," "exit Dig Mode," etc.) to stop the automatic movements and exit the Dig Mode. In some embodiments, any input by the operator exits the Dig Mode (e.g., acceleration, braking, steering, boom adjustment, etc.). In other embodiments, some inputs temporarily override the automatic movements (e.g., boom position, bucket curl, acceleration, steering, etc.) while some inputs immediately disable the Dig Mode (e.g., braking, pressing an emergency stop button, etc.). In some embodiments, the overriding adjustments may be used for training the automatic movements of the Dig Mode, as described herein.

Figure 5A:
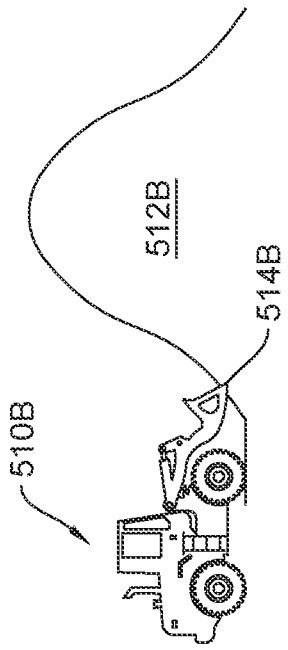
FIGS. 5A-5D is a side view of an automated digging procedure of the vehicle of FIG. 1, according to an exemplary embodiment.

Turning now to FIGS. 5A-5D, a vehicle 510A-510D is shown executing a digging event in the Dig Mode of FIG. 4. In FIG. 5A, a vehicle 510A is shown approaching a diggable medium 512A. In some embodiments, the vehicle 510A executes the steps and procedures as described in FIG. 4. For example, the vehicle 510A, having one or more processors to execute the following steps, detects the digging direction being engaged. This may involve computer vision detecting the mound of diggable medium 512A and a corresponding gear of the vehicle 510A engaged that would lead the vehicle 510A to approach, and engage with, the diggable medium 512A. In other embodiments, the vehicle 510A may have a digging implement 514A with a fixed digging direction (e.g., a front-end loader). In this embodiment if the fixed digging direction gear is engaged (e.g., forward), the vehicle 510A proceeds to detecting whether or not a Dig Mode is selected. As described above the digging mode may be selected by any number of means (e.g., voice, buttons, dials, touch screens, etc.).

Upon the one or more processors of the vehicle 510A detecting a digging gear direction engaged in the Dig Mode selected, the vehicle 510A automatically lowers the digging implement 514A to rest upon the ground in preparation for engaging with the diggable medium 512A. This may involve lowering a boom attached to the digging implement 514A and curling down the digging implement 514A. The one or more processors of the vehicle 510A then proceed to determine whether the steering angle of vehicle 510A is within a specified threshold. The specified threshold may be determined by the operator of the vehicle 510A prior to entering the Dig Mode or maybe predetermined by the manufacturer of the vehicle 510A. In some embodiments, the specified threshold is calibrated to the individual vehicle 510A and may be recalibrated over time. This calibration and recalibration may apply to all thresholds of the current disclosure. In one embodiment the specified threshold maybe +/−5 degrees from center so that the vehicle 510A engages with the diggable medium 512A straight on. In some embodiments the specified threshold may be determined automatically by the shape of the diggable medium 512A. For example, if the vehicle 510A is approaching the diggable medium 512A at an angle, the one or more processors, after determining a Dig Mode engagement, may determine (by processing data received by computer vision, RADAR, LiDAR, sonar, etc.) that the vehicle 510A must adjust the steering angle to result in the digging implement 514A engaging with the diggable medium 512A straight on. The one or more processors of the vehicle 510A may then activate the differential locks (or adjust other operating parameters) of the vehicle 510A. In some embodiments, the steering of the vehicle 510A may be limited once the steering angle has been aligned (automatically or manually) with the diggable medium 512A. This may ensure that the vehicle 510A engages with the diggable medium 512A straight on, thus maximizing efficiency of the vehicle's 512A power output.

Figure 5B:
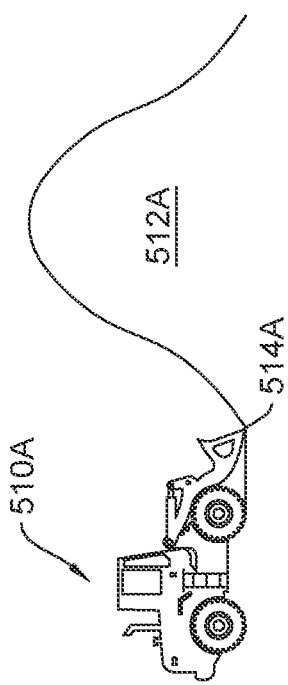

Turning now to FIG. 5B. In FIG. 5B a vehicle 510B is shown engaging with a diggable medium 512B. As the vehicle 510B engages with the diggable medium 512B, the one or more processors determine whether the transmission is within a threshold range of loading. The one or more processors automatically adjust the transmission during the initial engagement of the diggable medium 512B to ensure the transmission remains within the range of loading. In addition, the one or more processors determine if the engine speed (e.g., revolutions per minute) are within appropriate range for loading. Again, the one or more processors automatically adjust the engine speed to ensure the engine speed remains within an appropriate range for loading. In some embodiments, the vehicle 510B automatically moves forward to approach the diggable medium 512B once the Dig Mode is selected and engaged. The vehicle 510B adjusts the transmission and engine speed to automatically manage the forward ground speed to avoid excessive acceleration or deceleration during the Dig Mode operation.

Figure 5C:
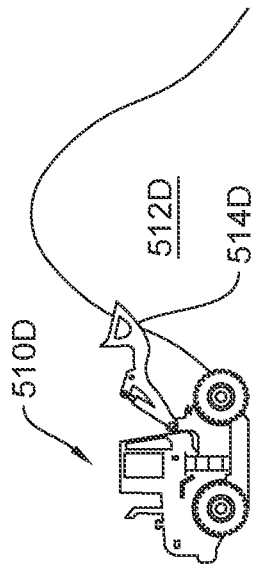

During the engagement of the digging implement 514B with the diggable medium 512B, the transmission torque may begin to exceed a first threshold as determined by the operator and/or the vehicle 510B manufacturer. The transmission torque threshold may be selected by the operator through an operator interface of the vehicle 510B or it may be programmed into the memory of the vehicle 510B. In some embodiments, the transmission torque threshold may be set for specific diggable medium 512 B, digging implement 514B, vehicles 510B, operators, foreman, etc. Additionally, default transmission torque thresholds may be set for each of these parameters. Turning now to FIG. 5C.

Figure 8:
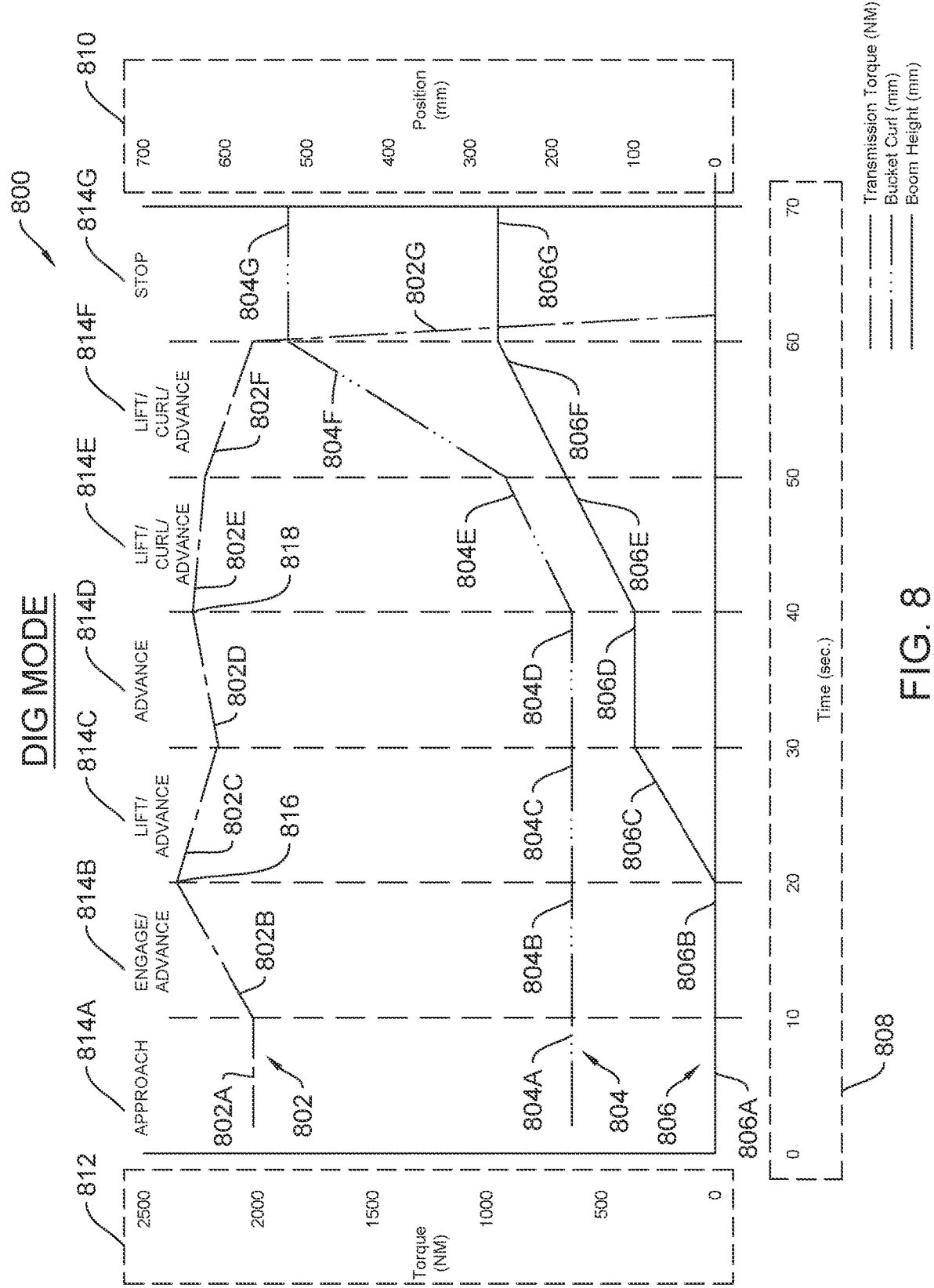
FIG. 8 graphically depicts a relationship of various operating parameters of the vehicle of FIG. 1 during an automated digging procedure, according to an exemplary embodiment.

FIG. 5C illustrates a vehicle 510C engaged with a diggable medium 512C with a digging implement 514C. Once the transmission torque threshold is reached and/or exceeded, the one or more processors transmit instructions to automatically lift the digging implement 514C. In doing so, the weight of the diggable medium 512C loaded in the digging implement 514C causes increased traction on the wheels of the vehicle 510C. This increased traction decreases then necessary transmission torque to continue engaging with the diggable medium 512C and the vehicle 510C continues forward into the diggable medium 512C. During this forward movement the one or more processors continually monitor the transmission torque to determine whether it exceeds a second transmission torque threshold. The second transmission torque threshold maybe the same as the previously described transmission torque threshold, or it may be a different transmission torque threshold. If the transmission torque does not exceed the second transmission torque threshold, the vehicle 510C automatically manages the forward ground speed to continue forward into the diggable medium 512C. Once the transmission torque of the vehicle 510C reaches and/or exceeds the second transmission torque threshold, the one or more processors cause the digging implement 514C to automatically curl up and for the boom of the digging implement 514C to lift. During this lifting and curling movement, the vehicle 510C may continue forward into the diggable medium 512C or it may stop forward movement prior to the automatic curl and lift. The relationship between the boom lift cycle and the bucket curl cycle may be correlated to result in a smooth lifting relationship and a continuous transmission of torque until the end of the cycle. The movement may be calibrated by the manufacturer or the operator. In some embodiments, the lift cycle may be linear, as shown in FIG. 8, and the curl cycle may be exponential, as shown in FIG. 8. It should be understood that these are merely exemplary relationships and are not intended in any way to limit the scope of the disclosure. Indeed, the relationship between lift and curl may be any appropriate relationship that results in a smooth lifting cycle and near-continuous torque loading.

The digging implement 514C continues lifting and curling until a predetermined boom height and/or bucket curl amount is reached. As with one or more of the previously described thresholds, the predetermined boom height may be set as a threshold by the operator and/or the vehicle 510C manufacturer. The boom height and bucket curl may be determined by one or more various methods for monitoring (hall effect sensors, limit switches, reed switches, potentiometers, etc.).

Figure 5D:
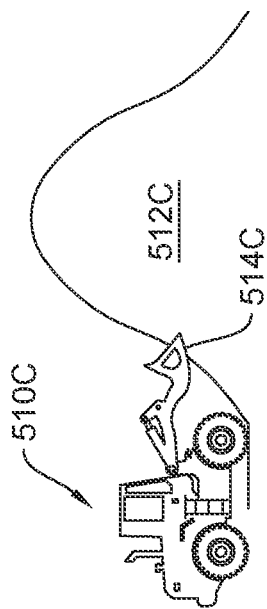

Turning now to FIG. 5D, in some embodiments, once the digging implement 514D reaches the boom height threshold, the vehicle 510D stops forward movement and lifting/curling the digging implement 514D. In other embodiments, the vehicle stops prior to lifting/curling the digging implement 514D. Regardless of the order in which the vehicle 510D lifts, curls, and stops, the vehicle then allows for operator adjustments to the vehicle parameters (steering angle, curl, boom height, gear, etc.). The vehicle 510D may then automatically shift to reverse (or the operator may manually change to reverse) and then travel in reverse. Once the vehicle 510D has traveled a specified distance in reverse (or otherwise exited the diggable medium 512D), the vehicle 510D exits the Dig Mode and changes to a Travel Mode. This change from Dig Mode to Travel Mode may be automatic once the specified distance is reached, or it may be prompted/selected by an operator input. In some embodiments, the specified distance may be correlated to the distance the vehicle 510D travels into the diggable medium 512D. For example, the vehicle 510D may calculate and/or measure the distance entered into the diggable medium 512D during the Dig Mode. Once the vehicle 510D is put into the reverse gear, the vehicle 510D may travel a distance in reverse that is equal to the distance travelled into the diggable medium 512D. In some embodiments, the vehicle 510D travels back the distance traveled in plus an additional buffer amount, to allow the digging implement 514D to fully exit the diggable medium 512D. In some embodiments, the distance is measured or calculated, in other embodiments, the distance to travel in reverse is determined by computer vision. For example, as the vehicle 510D exits the diggable medium 512D, one or more cameras receive images of the diggable medium 512D and the digging implement 514D. Once the one or more processors determine from the captured image data from the one or more cameras that the digging implement 514D is fully exited from the diggable medium 512D, the one or more processors cause the vehicle 510D to stop backwards motion and for the vehicle 510D to return to the Travel Mode. When entering the Travel Mode, the vehicle 510D may lower the boom of the digging implement to a lower level for travel and adjust the vehicle transmission to forward drive. Additionally, in some embodiments, the speed of the vehicle 510D may be limited during the Dig Mode. However, in the Travel Mode, the limits on speed of the vehicle 510D may be removed. In other embodiments, the limit on the speed of the vehicle 510D may be adjusted in the Travel Mode to correlate to the weight of the load on the digging implement 514D from the diggable medium. The vehicle 510D may have various sensors (e.g., computer vision to calculate load, strain gauges, springs/mass damper systems, etc.) to determine the weight of the diggable medium 512D payload in the digging implement 514D. Alternatively, the vehicle 510D may use the difference in tractive element pressure between pre- and post-loading to determine the weight of the payload.

In some embodiments, the vehicle 510D may include a tilt sensor for measuring the orientation of the vehicle 510D. This tilt sensor may be used to determine if the vehicle 510D is in a hazardous position (e.g., tilting, starting to roll over, lifting one or more tractive elements, exceeding load capacity). The tilt sensor may be in communication with the one or more processors of vehicle 510D. The one or more processors may receive the tilt sensor's transmitted data to determine a presence of the hazardous position. If the one or more processors determine, based on the tilt sensor's transmitted data that the vehicle 510D is in a hazardous position, the one or more processors may stop the automatic movements of the Dig Mode and return control to the operator. Additionally, in some embodiments, the one or more processors may transmit a notification to the operator indicating the hazardous position. In some embodiments, the one or more processors may also indicate recommended actions to mitigate or eliminate the hazardous position (e.g., dumping the payload, reversing, turning, stopping, etc.). In other embodiments, the one or more processors may automatically dump the collected payload if a hazardous or unsafe condition/position is detected by the tilt sensors, without input from the operator.

Figure 6A:
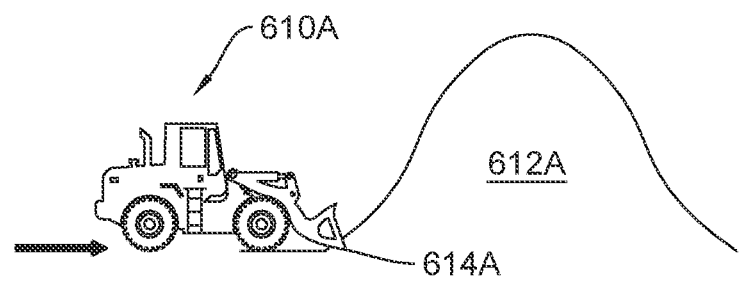
FIG. 6A-6C is a side view of an automated digging procedure of the vehicle of FIG. 1, according to an exemplary embodiment.
Figure 6B:
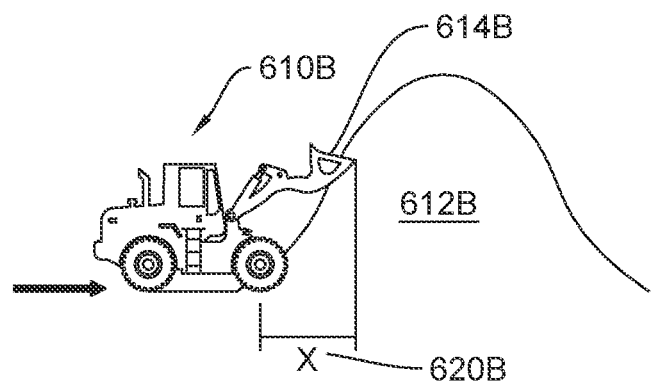
Figure 6C:
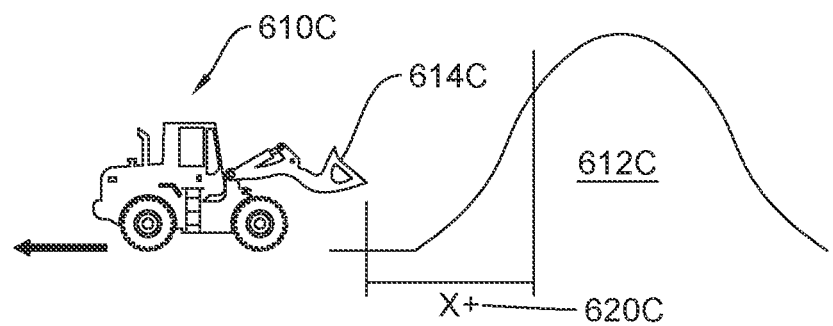

Turning now to FIGS. 6A-6C, a vehicle 610 is shown in the Dig Mode of FIG. 4. In FIG. 6A, a vehicle 610A is shown approaching a diggable medium 612A with a digging implement 614A engaged with the diggable medium 612A. Once the transmission torque (or other commensurate and/or measurable torque) reaches and/or exceeds a torque (or corollary) threshold, the digging implement 614A is lifted off of the ground. This results in a decrease in transmission torque (or other torque, e.g., boom connection toque, bucket connection toque, or axle torque). As the vehicle 610A travel further into the diggable medium 612A with the digging implement off the ground, the torque may increase again. Once it reaches a second threshold (which may or may not be the same as the first torque threshold), a boom of the digging implement 614A raises the digging implement 614A and the digging implement 614A is curled back, as shown in FIG. 6B. Once a digging implement 614B reaches a predetermined height, the vehicle stops curling the digging implement 614B and raising the boom of the digging implement of 614B. The vehicle measures and/or calculate the distance "X" 620B to determine how far into the diggable medium the vehicle 610B has travelled during the Dig Mode. This distance "X" 620B is then used to determine the distance "X+" 620C of FIG. 6C. The distance "X+" 620C of FIG. 6C is the distance that the vehicle 610C may travel in reverse to exit the diggable medium 612C after loading the digging implement 614C with the diggable medium 612C. The vehicle 610B of FIG. 6B may measure the distance "X" 620 by revolution of the wheels, speed of the engine, GPS tracking, load calculations, etc. In some embodiments, one or more wheels of the vehicle 610B may slip during the loading event as shown in FIG. 6B. In this case, measurements of the wheel rotations may lead to a distance "X" 620B that is too large. In these and other embodiments, the vehicle may have one or more sensors to calculate vehicle slip (e.g., through actual distance travel based on GPS coordinates, axle torque amounts, transmission torque amounts, etc.) and use this calculated or measured vehicle slip in the calculation of the distance "X" 620B.

Figure 7B:
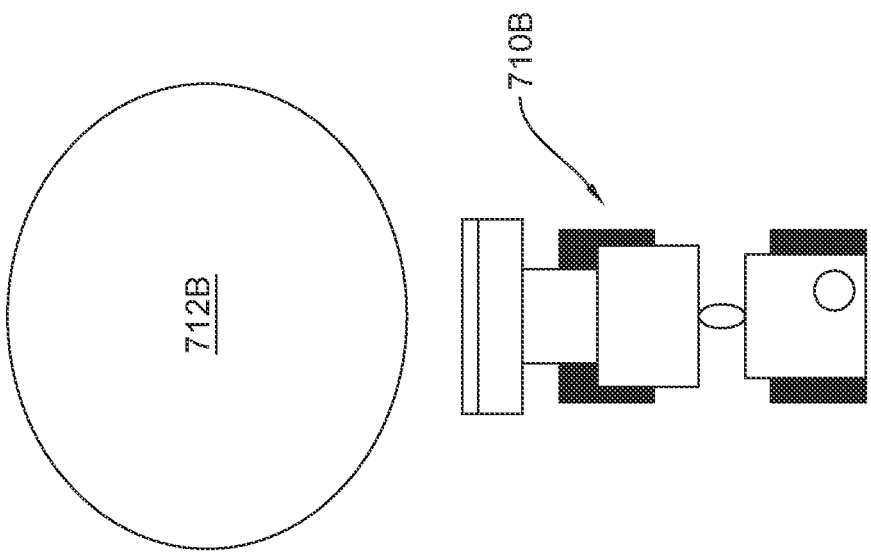
FIG. 7A-7B is a top view of an automated digging procedure of the vehicle of FIG. 1, according to an exemplary embodiment.
Figure 7A:
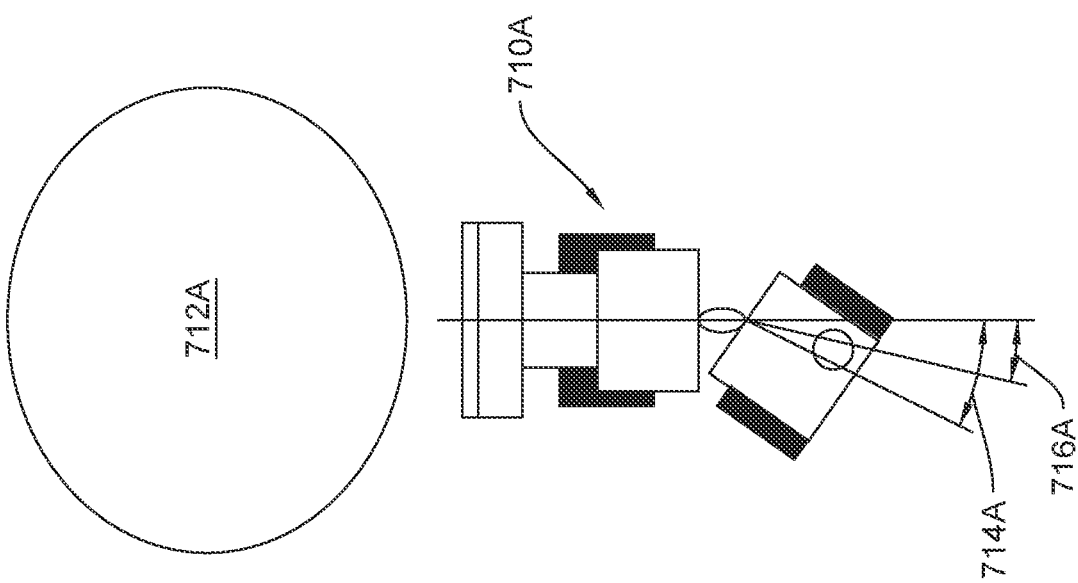

Turning now to FIGS. 7A-7B, an overhead view of a vehicle automatically aligning with a diggable medium. As described herein, once a vehicle enters a Dig Mode, one or more tractive elements (e.g., wheels, tracks, etc.) align within a predetermined steering threshold 716A (e.g., +/−5 degrees). For example, a vehicle 710A of FIG. 7A approaches a diggable medium 712A while at a steering angle 714A. The operator may selectively enter (or otherwise automatically enter) the Dig Mode. Once the vehicle 710A has entered the Dig Mode, the vehicle 710A (or one or more processors of the vehicle 710A) receives an indication of the steering angle 714A. If the steering angle 714A is outside the predetermined steering threshold 716A, the one or more processors of the vehicle 710A automatically adjust the steering angle 714A until it is within the predetermined steering threshold 716A. In other embodiments, the one or more processors may transmit a notification (e.g., visual, haptic, aural, etc.) to alert the operator that the steering angle is outside the predetermined steering threshold 716A. In some embodiments, the operator manually adjusts the steering angle 714A until it is within the predetermined steering threshold 716A, at which point the one or more processors stops notifying the operator. In some embodiments, once the predetermined steering threshold 716A is reached, a second notification is transmitted to the operator or operator device alerting the user that the predetermined steering threshold 716A has been reached. As with the first notification, the second notification may be visual, aural, haptic, etc. FIG. 7B illustrates a vehicle 710B with a steering angle aligned with a diggable medium 712B. In some embodiments, once the vehicle 710B is in position with the steering angle within the predetermined steering threshold, the vehicle 710B limits the steering ability to ensure forward travel to maximize efficiency in engaging with the diggable medium 712B.

Turning now to FIG. 8, a graph 800 illustrating a general relationship between a transmission torque 802, a boom height 806, and a bucket curl 804. It should be understood that these relationship, values, and trends are generalized and should not be construed as limiting the disclosure to the specific embodiment illustrated in FIG. 8. In one embodiment, a vehicle (e.g., vehicle 10 of FIG. 1) may have a digging implement coupled to the vehicle (e.g., digging implement 514A of FIG. 5A). The graph 800 includes an x-axis 808 that represents time in seconds, a first y-axis 812 that represents a transmission torque in newton-meters (Nm), and a second y-axis 810 that represents a position of the boom and bucket in millimeters (mm). The graph 800 is split into seven sections: an approach 814A, engage/advance 814B, lift/advance 814C, advance 814D, lift/curl/advance 814E, lift/curl/advance 814F, and stop 814G. In the approach 814A, the boom position 806A is at a position in which the bucket is resting on the ground, the bucket curl 804A is at a predetermined amount so as to scoop a diggable medium resting on the ground, and the transmission torque is at a resting amount. The vehicle 10 approaches the diggable medium in this position.

At engage/advance 814B, the digging implement engages with the diggable medium, and the vehicle 10 advances the digging implement into the pile of diggable medium. During this section, the transmission torque 802B steadily increases as the digging implement advances into the diggable medium. The boom position 806B is again resting the bucket on the ground and the bucket curl 804B is maintained.

Once the transmission torque 802C reaches a torque threshold 816, the vehicle 10 enters the lift/advance 814C movement. In the lift/advance 814C movement, the boom position 806C lifts to remove the bucket from resting on the ground. The bucket curl 804C is maintained. Once the boom position 806C is raised, the tractive elements of the vehicle 10 are increasingly loaded because the bucket is no longer resting on the ground. This causes increased traction on the tractive elements and reduces friction from pushing the bucket along the ground. Accordingly, the transmission torque 802C decreases. After the lift/advance 814C movement, the boom position 806D remains at a constant height along with the bucket curl 804D remaining in the same position as well. In this position, the vehicle 10 advances, causing additional diggable medium to load into the bucket and causing the transmission torque 802D to increase again. In some embodiments, the bucket curl 804D may adjust during this step.

Once a second transmission torque threshold 818 is reached, the vehicle 10 enters a lift/curl/advance 814E movement. In this section, the vehicle 10 begins to again lift the boom position 806E and begins to curl the bucket curl 804E. As this action occurs, the transmission torque 802E decreases because the bucket starts to load less diggable medium. This lift and curl action may occur linearly, parametrically, exponentially, or in any other motion/speed. Likewise, the lift and curl may change at different rates, as shown by boom position 806E-F and bucket curl 804E-F. In some embodiments, the lift and curl are programmed with predetermined motions to result in a smooth and continuous motion to cause a steady transmission torque. In some embodiments, the motion is dependent on a type of diggable medium (e.g., sand, dirt, rock, pea gravel, etc.) or a condition of the diggable medium (dry, wet, etc.). The lift/curl/advance 814F continues with the transmission torque 802F decreasing as the bucket position 806F increases and the bucket curl 804F continues to curl up.

Upon the bucket curl 804G and/or the boom position 806G reaching a predetermined threshold (e.g., by a position, angle, or loaded weight), the vehicle 10 stops advancing, lifting the boom, and curling the bucket. In one exemplary embodiment, the methods and systems described in FIG. 8 occur autonomously without operator input. Once the vehicle 10 enters Dig Mode, the vehicle 10 initiates the digging event by following the above steps in order to optimize digging potential of the vehicle 10. After the stop 814G step, the vehicle 10 may automatically reverse and exit the diggable medium. In other embodiments, the operator must take control of the vehicle 10 to initiate the reverse movement, after which the vehicle 10 will execute the reverse motion and exit the diggable medium. In other embodiments, the operator must execute the reverse motion manually to exit the diggable medium.

Record Mode

In addition to a Travel Mode and a Dig Mode, some embodiments of the present disclosure include a Recording Mode. In the Recording Mode, the vehicle 10 of FIG. 1 may record the adjustments that the operator makes to the vehicle 10 during a digging event. This may include recording the steering angle, angle of attack, boom lift rate, bucket curl rate, boom lift height, bucket curl amount, distance traveled backwards when exiting the diggable medium, differential lock engagement, load amount, speed of travel, and corresponding transmission torques associated with each adjustment. The vehicle can record the adjustments the operator makes during one or more digging event and then use various machine learning protocols (either locally or remotely) to determine the operator's preferences when engaging in a digging event. The operator may then apply these learned preferences to the Dig Mode to optimize the Dig Mode for the operator's preferences. In this way, the operator may then set default parameters of the Dig Mode to mimic the operator's actions. These actions and adjustments may or may not coincide with the vehicle's original Dig Mode algorithm. And these default parameters may be applied to all operators of the vehicle 10, or may be adjusted to only apply when the training operator is operating the vehicle. The vehicle may determine which operator is operating the vehicle in order to apply unique digging preferences when entering the dig (or other) mode. For example, a first operator may use an ID card that is associated with the first operator that may communicate (e.g., by NFC, magnetic strip, computer vision, etc.) with the vehicle 10. Upon receiving a communication from the ID card indicating the operator, the vehicle 10 may apply the relevant preferences. In other embodiments, the vehicle 10 may have one or more image capturing devices (e.g., cameras, LiDAR, RADAR, thermal imaging, etc.) to capture information of an operator in or entering the vehicle 10 to determine which operator preferences to apply. The vehicle 10 may store multiple profiles corresponding to multiple operators.

To learn the operator's preferences, the one or more processors of the vehicle 10 may use various machine learning and/or artificial intelligence techniques to generate the operator's default parameters. Examples of artificial learning mechanisms include artificial neural networks, and data mining. Methods to be used in some of the embodiments may include anomaly detection, association rule learning, clustering, classification and/or regression analysis for data mining. Similarly, the one or more processors (or networks) used for artificial neural networks may include feed-forward or feedback loops, supervised learning, reinforcement learning, back propagation algorithms and Bayesian networks.

In an embodiment, the vehicle 10 may receive user data associated with different operators from a database and analyze the operator data to identify operators with one or more similar attributes by statistically clustering and classifying sets of parameters (e.g., age, skill, experience, training) of different operators. The application server may also user other statistical artificial intelligence models, such as random forest model, to identify similar operators (with similar parameters) and recommend Dig Mode parameters based on similar operators' preferences. For example, the vehicle 10 may recommend a foreman's Dig Mode parameter preferences to all of the workers under the foreman. Alternatively, the vehicle 10 may decrease the speed limit on vehicle 10 during Dig Mode for a new operator-in-training. The application server may also use each particular operator's previous selections as a training model for refining the artificial intelligence model. For example, the operator's previous selections (e.g., steering angle, boom lift, bucket curl, speed, etc.) may be used as a training set to accurately predict the operator's preferences. The artificial intelligence model may use variety of different techniques to generate and continuously update a profile for each operator using the operator's selections and adjustments.

Hybrid Mode

Similar to, yet distinct from, the Recording Mode, the vehicle 10 may also have a selectable Hybrid Mode. In the Hybrid Mode, the vehicle 10 initiates a digging event in a Dig Mode as determined by the calculated algorithm for an optimized digging procedure, but allows the operator to override the automatic movements of the vehicle 10 in the Dig Mode. In some embodiments of the Hybrid Mode, the one or more processors of the vehicle 10 learn (as in the learn mode) from the operator's overriding adjustments. This embodiment allows a user to start with the predefined/preprogramed movements for Dig Mode but allows the operator to update the Dig Mode parameters on the fly. The vehicle 10 may continually home in on the operator's preferences based on consistency of the operator's overriding tendencies. The Hybrid Mode parameters may continually be refined. For example, the default movements by the vehicle 10 during the Dig Mode may change overtime as the vehicle 10 learns from the operator's overriding actions to better reflect the operator's preferences.

Travel Mode

The vehicle 10 may have yet another selectable mode: a Travel Mode. Upon exiting the diggable medium during the dig or Hybrid Mode, the user may select a Travel Mode. Alternatively, vehicle 10 enters Travel Mode automatically based on exiting the diggable medium a predetermined distance. The Travel Mode of the vehicle 10 may adjust several operating parameters of the vehicle 10 (e.g., speed limit, boom height, bucket curl, steering limits, etc.) that were set in the Dig Mode or Hybrid Mode. For example, in the Dig Mode, the vehicle's 10 steering may be limited to +/−5 degrees and the maximum speed limit reduced to 5 mph. Upon entering the Travel Mode, the steering limits may be removed, and the maximum speed limit may be raised or removed completely. In some embodiments, the Travel Mode operating parameters may be set based on the operator. For example, a new operator in training may have a maximum speed limit still set during Travel Mode, albeit higher than the maximum speed limit of the Dig Mode. Additionally, the boom height may be lowered from the Dig Mode to lower the center of gravity during high-speed travel. This reduces operator oscillations during travel which in turn reduces operator fatigue and vehicle damage.

Figure 9:
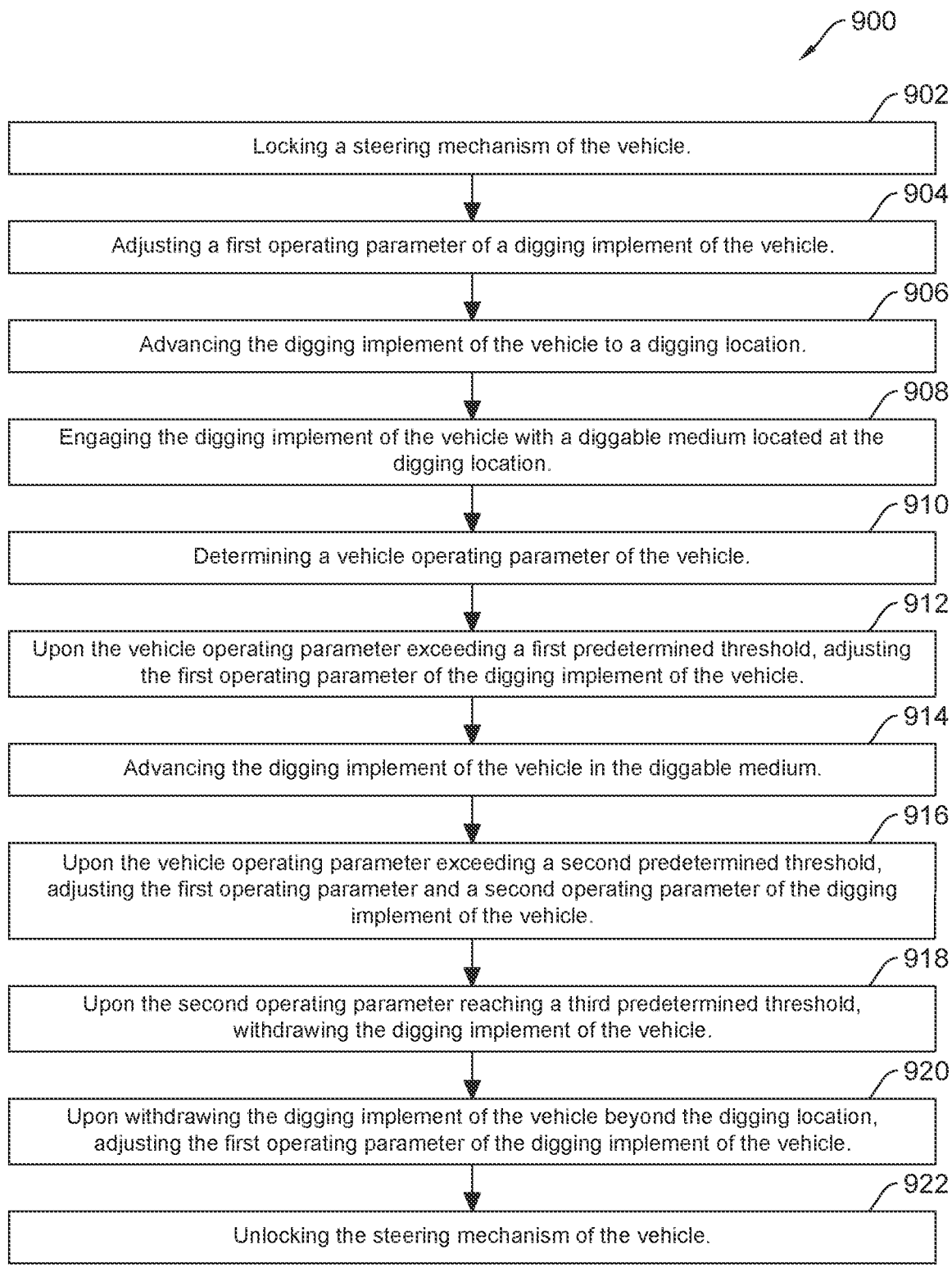
FIG. 9 is a flow diagram of an automated digging procedure of the vehicle of FIG. 1, according to an exemplary embodiment.

Turning now to FIG. 9, a flow diagram 900 of an automatic digging procedure is shown. At step 902, a system executing the automatic digging procedure locks a steering mechanism of a vehicle. This locking may be based in software and/or hardware. At step 904, the system adjusts a first operating parameter (e.g., a vertical boom height, bucket curl, etc.) of a digging implement of the vehicle. At step 906, the system advances a digging implement (e.g., a bucket) of the vehicle to a digging location (e.g., a pile of diggable medium). At step 908, the system engages the digging implement of the vehicle with a diggable medium (e.g., crushed stone, sand, dirt, etc.) located at the digging location. At step 910, the system determines a vehicle operating parameter of the vehicle (e.g., a transmission torque). At step 912, upon the vehicle operating parameter exceeding a first predetermined threshold, the system adjusts the first operating parameter of the digging implement of the vehicle (e.g., lifting the boom). At step 914, the system advances the digging implement of the vehicle in the diggable medium. At step 916, upon the vehicle operating parameter exceeding a second predetermined threshold, the system adjusts the first operating parameter (e.g., lifts the boom) and a second operating parameter of the digging implement of the vehicle (curls the bucket). At step 918, upon the second operating parameter reaching a third predetermined threshold, the system withdraws the digging implement of the vehicle. At step 920, upon withdrawing the digging implement of the vehicle beyond the digging location, the system adjusts the first operating parameter of the digging implement of the vehicle (e.g., lowers the boom). At step 922, the system unlocks the steering mechanism of the vehicle.

Figure 10:
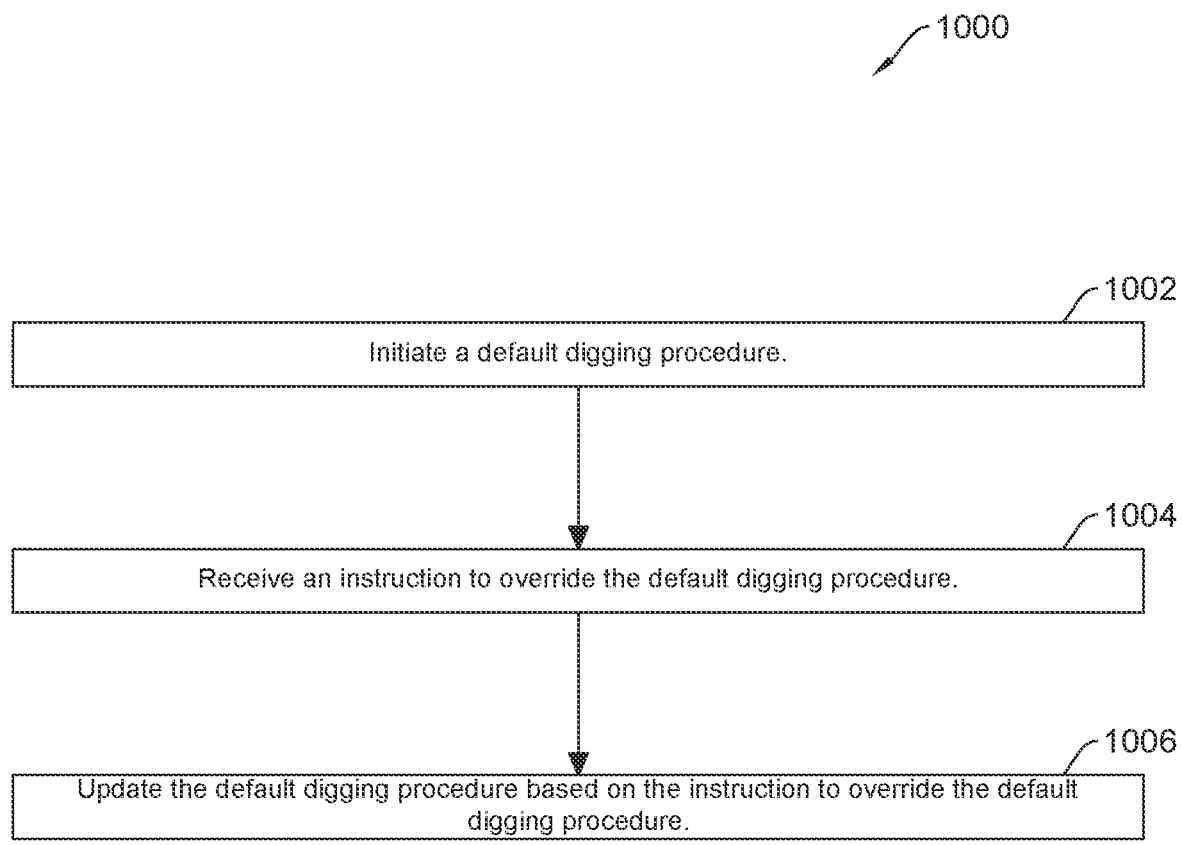
FIG. 10 is a flow diagram of an automated digging procedure of the vehicle of FIG. 1, according to an exemplary embodiment.

Turning now to FIG. 10, a flow diagram 1000 of an automatic digging procedure is shown. At step 1002, a system executing the automatic digging procedure initiates a default digging procedure. In some embodiments, the default digging procedure may be the Dig Mode, as described herein. At step 1004, the system receives an instruction to override the default digging procedure. During the executing of the Dig Mode, an operator may determine to adjust the one or more operating parameters of the vehicle during automatic digging procedure. At step 1006, the system receives an instruction to override the default digging procedure. At step 1008, the system updates the default digging procedure based on the instruction to override the default digging procedure. In some embodiments, the system trains an artificial intelligence protocol to determine the preferences of the operator and then executes the artificial intelligence (e.g., machine learning) protocol to determine the operator's preferences based on the overriding actions. In one embodiment, the method illustrated in FIG. 10 is described herein as the Hybrid Mode or Recording Mode.

In the disclosure presented herein, when one or more processors are described as executing or otherwise doing an action, it should be understood that this may include transmitting instructions for one or more subsystems of the vehicle 10 to perform the action.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 202, the control system 200, etc.) as shown in the various exemplary embodiments is illustrative only. Additionally, any element disclosed in one embodiment may be incorporated or utilized with any other embodiment disclosed herein.

The invention claimed is:

1. A method comprising:
    upon receiving, by one or more processors, an indication to enable a Dig Mode of a vehicle, transmitting, by the one or more processors to one or more systems of the vehicle, instructions to perform a plurality of steps comprising:
        locking a steering mechanism of the vehicle;
        adjusting a first operating parameter of a digging implement of the vehicle;
        advancing the digging implement of the vehicle to a digging location;
        engaging the digging implement of the vehicle with a diggable medium located at the digging location;
        determining a vehicle operating parameter of the vehicle;
        upon the vehicle operating parameter exceeding a first predetermined threshold, adjusting the first operating parameter of the digging implement of the vehicle;
        advancing the digging implement of the vehicle in the diggable medium;
        upon the vehicle operating parameter exceeding a second predetermined threshold, adjusting the first operating parameter and a second operating parameter of the digging implement of the vehicle;
        upon the second operating parameter reaching a third predetermined threshold, withdrawing the digging implement of the vehicle;
        upon withdrawing the digging implement of the vehicle beyond the digging location, adjusting the first operating parameter of the digging implement of the vehicle; and
        unlocking the steering mechanism of the vehicle.

2. The method of claim 1, wherein the first operating parameter of the digging implement of the vehicle is a vertical position of the digging implement.

3. The method of claim 1, wherein the second operating parameter of the digging implement of the vehicle is a curl position of the digging implement.

4. The method of claim 1, wherein the vehicle operating parameter is a torque exerted on the digging implement.

5. The method of claim 1, the plurality of steps further comprising, upon receiving, by the one or more processors, a steering input from an operator interface, unlocking the steering mechanism of the vehicle and adjusting the steering mechanism to a position associated with the steering input from the operator interface.

6. The method of claim 1, wherein the one or more processors transmit an instruction to disable the Dig Mode in response to transmitting the instruction for unlocking the steering mechanism of the vehicle.

7. The method of claim 1, wherein engaging the digging implement of the vehicle with the diggable medium comprises actuating one or more tractive elements of the vehicle to propel the vehicle and the digging implement in a trajectory towards the diggable medium.

8. A system comprising:
a vehicle;
a digging implement cooperatively coupled to the vehicle; and
one or more processors configured to receive an indication to enable a Dig Mode and, upon receiving the indication to enable the Dig Mode, transmit instructions to one or more systems of the vehicle to perform a plurality of steps comprising:
   locking a steering mechanism of the vehicle;
   adjusting a first operating parameter of the digging implement of the vehicle;
   advancing the digging implement of the vehicle to a digging location;
   engaging the digging implement of the vehicle with a diggable medium located at the digging location;
   determining a vehicle operating parameter exerted of the vehicle;
   upon the vehicle operating parameter exceeding a first predetermined threshold, adjusting the first operating parameter of the digging implement of the vehicle;
   advancing the digging implement of the vehicle in the diggable medium;
   upon the vehicle operating parameter exceeding a second predetermined threshold, adjusting the first operating parameter and a second operating parameter of the digging implement of the vehicle;
   upon the second operating parameter reaching a third predetermined threshold, withdrawing the digging implement of the vehicle;
   upon withdrawing the digging implement of the vehicle beyond the digging location, adjusting the first operating parameter of the digging implement of the vehicle; and
   unlocking the steering mechanism of the vehicle.

9. The system of claim 8, wherein the first operating parameter of the digging implement of the vehicle is a vertical position of the digging implement.

10. The system of claim 8, wherein the second operating parameter of the digging implement of the vehicle is a curl position of the digging implement.

11. The system of claim 8, wherein the vehicle operating parameter is a torque exerted on the digging implement.

12. The system of claim 8, the plurality of steps further comprising, upon receiving, by the one or more processors, a steering input from an operator interface, unlocking the steering mechanism of the vehicle and adjusting the steering mechanism to a position associated with the steering input from the operator interface.

13. The system of claim 8, wherein the one or more processors transmit an instruction to disable the Dig Mode in response to transmitting the instruction for unlocking the steering mechanism of the vehicle.

14. The system of claim 8, engaging the digging implement of the vehicle with the diggable medium comprises actuating one or more tractive elements of the vehicle to propel the vehicle and the digging implement in a trajectory towards the diggable medium.

15. A vehicle comprising:
a digging implement cooperatively coupled to the vehicle; and
one or more processors configured to receive an indication to enable a Dig Mode and, upon receiving the indication to enable the Dig Mode, transmit instructions to one or more systems of the vehicle to perform a plurality of steps comprising:
   locking a steering mechanism of the vehicle;
   adjusting a first operating parameter of the digging implement of the vehicle;
   advancing the digging implement of the vehicle to a digging location;
   engaging the digging implement of the vehicle with a diggable medium located at the digging location;
   determining a vehicle operating parameter exerted of the vehicle;
   upon the vehicle operating parameter exceeding a first predetermined threshold, adjusting the first operating parameter of the digging implement of the vehicle;
   advancing the digging implement of the vehicle in the diggable medium;
   upon the vehicle operating parameter exceeding a second predetermined threshold, adjusting the first operating parameter and a second operating parameter of the digging implement of the vehicle;
   upon the second operating parameter reaching a third predetermined threshold, withdrawing the digging implement of the vehicle;
   upon withdrawing the digging implement of the vehicle beyond the digging location, adjusting the first operating parameter of the digging implement of the vehicle; and
   unlocking the steering mechanism of the vehicle.

16. The vehicle of claim 15, wherein the first operating parameter of the digging implement of the vehicle is a vertical position of the digging implement.

17. The vehicle of claim 15, wherein the second operating parameter of the digging implement of the vehicle is a curl position of the digging implement.

18. The vehicle of claim 15, wherein the vehicle operating parameter is a torque exerted on the digging implement.

19. The vehicle of claim 15, the plurality of steps further comprising, upon receiving, by the one or more processors, a steering input from an operator interface, unlocking the steering mechanism of the vehicle and adjusting the steering mechanism to a position associated with the steering input from the operator interface.

20. The vehicle of claim 15, wherein the one or more processors transmit an instruction to disable the Dig Mode in response to transmitting the instruction for unlocking the steering mechanism of the vehicle.

* * * * *